(12) United States Patent
Bushko

(10) Patent No.: US 7,810,818 B2
(45) Date of Patent: Oct. 12, 2010

(54) ACTIVE VEHICLE SUSPENSION SYSTEM

(76) Inventor: Dariusz Antoni Bushko, c/o Bose Corporation, The Mountain, Framingham, MA (US) 01701

( * ) Notice: Subject to any disclaimer, the term of this patent is extended or adjusted under 35 U.S.C. 154(b) by 764 days.

(21) Appl. No.: 11/289,838

(22) Filed: Nov. 29, 2005

(65) Prior Publication Data

US 2007/0120333 A1    May 31, 2007

(51) Int. Cl.
    B60G 17/005    (2006.01)
(52) U.S. Cl. .................................................. 280/5.507
(58) Field of Classification Search .............. 280/5.507, 280/5.508, 5.515, 124.106, 124.107, 124.145, 280/5.506
    See application file for complete search history.

(56) References Cited

U.S. PATENT DOCUMENTS

| | | | |
|---|---|---|---|
| 4,167,296 A | 9/1979 | Dendy | |
| 4,546,997 A | 10/1985 | Smyers | |
| 4,700,972 A | 10/1987 | Young | |
| 4,862,983 A | 9/1989 | Kreft | |
| 4,981,309 A | 1/1991 | Froeschle | |
| 5,091,679 A | 2/1992 | Murty et al. | |
| 5,284,353 A | 2/1994 | Yokohama et al. | |
| 5,293,969 A | 3/1994 | Yamaoka et al. | |
| 5,350,983 A | 9/1994 | Miller et al. | |
| 5,590,898 A | 1/1997 | Williams et al. | |
| 6,000,702 A | 12/1999 | Streiter | |
| 6,161,844 A | 12/2000 | Charaudeau et al. | |
| 6,170,838 B1 | 1/2001 | Laurent et al. | |
| 6,550,797 B2* | 4/2003 | Wagner | 280/124.136 |
| 6,619,672 B2 | 9/2003 | Charaudeau et al. | |
| 6,721,641 B1 | 4/2004 | Denne | |
| 6,942,202 B2 | 9/2005 | Kienholz | |
| 6,945,541 B2* | 9/2005 | Brown | 280/5.507 |
| 6,959,795 B2 | 11/2005 | Kienholz | |
| 2005/0052150 A1 | 3/2005 | Bender | |
| 2005/0098964 A1 | 5/2005 | Brown | |
| 2005/0280218 A1 | 12/2005 | Parison et al. | |

FOREIGN PATENT DOCUMENTS

| | | |
|---|---|---|
| EP | 0 616 412 | 9/1994 |
| EP | 0 878 332 | 11/1998 |
| EP | 0 982 162 | 3/2000 |
| EP | 1 110 846 B1 | 3/2004 |
| EP | 1 440 826 | 7/2004 |
| JP | 2037016 | 2/1990 |

(Continued)

OTHER PUBLICATIONS

European Search Report dated Jul. 7, 2007, issued in European Patent Application No. 06124956.1, filed Nov. 28, 2006.

(Continued)

*Primary Examiner*—Faye M. Fleming
(74) *Attorney, Agent, or Firm*—Bose Corporation

(57) ABSTRACT

An active suspension system for a vehicle includes an active suspension element that is substantially rigidly attached to a frame of the vehicle such that a motion of an armature of the active suspension element is mechanically decoupled from a lateral motion of a wheel of the vehicle. A control rod is attached between the active suspension element and the wheel of the vehicle.

16 Claims, 11 Drawing Sheets

FOREIGN PATENT DOCUMENTS

| | | |
|---|---|---|
| JP | 03 197222 | 8/1991 |
| JP | 10086621 A | 4/1998 |
| JP | 10246273 | 9/1998 |
| JP | 10292847 A | 11/1998 |
| JP | 2003287082 A | 10/2003 |

OTHER PUBLICATIONS

CN Office Action dated Sep. 4, 2009 for CN 200610172899.0.

Russion Office Action dated Dec. 10, 2009 for RU Appl. No. 2006142130.

RU Office Action dated Jan. 25, 2010 for RU Appln. No. 2006142130.

RU Office Action dated Jun. 17, 2010 for RU Appln. No. 2006142130.

RU Notice of Allowance dated Aug. 13, 2010 for RU Appln. No. 2006142130.

* cited by examiner

ACTIVE VEHICLE SUSPENSION SYSTEM

BACKGROUND OF THE INVENTION

Active vehicle suspension systems generally include a controllable suspension element such as a variable force actuator. The controllable suspension element is generally coupled between a wheel assembly and a chassis of the vehicle through the suspension tower.

SUMMARY OF THE INVENTION

In one aspect, the invention is embodied in an active suspension system for a vehicle. The active suspension system includes an active suspension element that is substantially rigidly attached to a frame of the vehicle such that a motion of an armature of the active suspension element is substantially mechanically decoupled from a lateral motion of a wheel of the vehicle. The lateral motion can be a fore-aft motion or a side-side motion. A control rod is attached between the armature of the active suspension element and the wheel of the vehicle.

In one embodiment, the active suspension element is substantially mechanically decoupled from a suspension linkage of the vehicle. The active suspension element can be substantially mechanically decoupled from a steering linkage of the vehicle. The system can also include a passive suspension element that is configured to support a portion of a mass of the vehicle.

In some embodiments, a first end of the control rod is attached to the armature of the active suspension element through either a ball joint or a bushing. The distance between the active suspension element and a tire of the vehicle can be about two centimeters or more.

In another aspect, the invention is embodied in a method for actively suspending a chassis of a vehicle. The method includes attaching an active suspension element to a frame of the vehicle such that a motion of an armature of the active suspension element is substantially mechanically decoupled from a lateral motion of a wheel of the vehicle. The lateral motion can be a fore-aft motion or a side-side motion. The method also includes attaching a control rod between the armature of the active suspension element and the wheel of the vehicle.

In one embodiment, the method also includes attaching a passive suspension element to a frame of the vehicle. The active suspension element can be attached to the frame through a bushing. In one embodiment, the active suspension element is substantially mechanically decoupled from a suspension linkage of the vehicle. The active suspension element can be substantially mechanically decoupled from a steering linkage of the vehicle In another aspect, the invention is embodied in an active suspension system for a vehicle. The active suspension system includes a linear electromagnetic actuator having a stator and an armature that is movable relative to the stator. The stator is substantially rigidly attached to a frame of the vehicle. A first end of a control rod is attached to the armature. A second end of the control rod is attached to a wheel of the vehicle such that a movement of the armature causes the wheel of the vehicle to move relative to the frame of the vehicle. The stator of the active suspension element can be rigidly attached to the frame of the vehicle or can be attached to the frame through a bushing.

The active suspension system can also include a passive suspension element that is coupled between the frame of the vehicle and the wheel of the vehicle. Alternatively, the passive suspension element can be coupled between a chassis of the vehicle and the wheel of the vehicle. The passive suspension element can be a spring, a damper or a combination thereof. The linear electromagnetic actuator can include a moving magnet electromagnetic actuator.

The first end of the control rod can be attached to the armature through a ball joint or a bushing. A movement of the armature can cause the wheel of the vehicle to move in a substantially vertical direction relative to a horizontal plane of the vehicle. In one embodiment, a ratio between a motion of the armature and a motion of the wheel can be substantially one-to-one. Alternatively, the ratio between a motion of the armature and a motion of the wheel can be less than one-to-one.

The active suspension system can also include a sensor that is attached to one of the linear electromagnetic actuator, the frame, and the wheel. The sensor can be integrated with the linear electromagnetic actuator.

In one embodiment, the control rod includes a bent portion. In one embodiment, the motion of the armature is substantially decoupled from the motion of the wheel. The active suspension system can also include a cover that substantially shields the armature. The active suspension system can also include a bellows that surrounds at least a portion of the control rod. In one embodiment, the linear electromagnetic actuator can be substantially decoupled from a steering linkage of the vehicle.

In another aspect, the invention is embodied in a method for actively suspending a chassis of a vehicle. The method includes attaching a stator of a linear electromagnetic actuator to a frame of the vehicle. The chassis of the vehicle is attached to the frame. A first end of a control rod is attached to an armature of the linear electromagnetic actuator. The armature is movable relative to the stator. The method also includes attaching a second end of the control rod to a wheel of the vehicle such that a movement of the armature causes the wheel of the vehicle to move relative to the frame of the vehicle.

The method can also include attaching a passive suspension element between the frame of the vehicle and the wheel of the vehicle. The method can also include attaching a passive suspension element between a chassis of the vehicle and the wheel of the vehicle. The passive suspension element can be a spring, a damper or a combination thereof. The linear electromagnetic actuator can embody a moving magnet electromagnetic actuator.

The method can also include bushing the stator of the active suspension element to the frame of the vehicle. In one embodiment, the method includes ball joining the first end of the control rod to the armature. The method can include bushing the first end of the control rod to the armature. In one embodiment, the movement of the armature causes the wheel of the vehicle to move in a substantially vertical direction relative to a horizontal plane of the vehicle.

In one aspect, the invention is embodied in a linear electromagnetic actuator for an active suspension system of a vehicle. The actuator includes a stator. An armature is magnetically coupled to the stator. A first bearing is mechanically coupled to the armature. The first bearing maintains an air gap between the armature and the stator. A second bearing is mechanically coupled to the stator and substantially mechanically decoupled from the armature. The second bearing absorbs suspension related bending loads; thereby minimizing the suspension related bending loads on the armature.

In one embodiment, the stator includes at least one coil. The armature can include at least one magnet. In one embodiment, the first bearing supports a magnetic load from an interaction of the armature and the stator. The first bearing can be mechanically coupled to the second bearing through one of a pin and a flexure.

A carriage can be mechanically coupled to the second bearing. The carriage can be mechanically coupled to the first bearing through one of a pin and a flexure. In one embodiment, the pin allows the carriage to move relative to the first bearing. The carriage can be mechanically coupled to a wheel of the vehicle through a control rod. One end of the control rod can be coupled to the carriage through one of a ball joint and a bushing.

In another aspect, the invention is embodied in a linear electromagnetic actuator for an active suspension system of a vehicle. The actuator includes a stator. An armature is magnetically coupled to the stator such that the armature is movable relative to the stator. A housing surrounds the stator and the armature. An envelope of the housing remains fixed regardless of the position of the armature relative to the stator. The housing can be substantially rigidly attached to a frame of the vehicle. The envelope of the housing refers to the dimensions of the housing.

A control rod includes a first end that is attached to the armature and includes a second end that is attached to a wheel of the vehicle. A movement of the armature causes the wheel of the vehicle to move relative to a frame of the vehicle. In one embodiment, the armature is mechanically coupled to the stator through a bearing.

In another aspect, the invention is embodied in an active suspension system for a vehicle. The active suspension system includes a linear electromagnetic actuator having a stator and an armature that is movable relative to the stator. The stator is substantially rigidly attached to a frame of the vehicle. A controller is electrically coupled to the linear electromagnetic actuator through one or more non-flexing cables.

The one or more non-flexing cables can include at least one of a signal cable and a power cable. The actuator can also include an amplifier that is electrically coupled to the controller. The stator can be attached to the frame of the vehicle through a bushing. A first end of the control rod is attached to the armature and a second end of the control rod is attached to a wheel of the vehicle. A movement of the armature causes the wheel of the vehicle to move relative to the frame of the vehicle.

BRIEF DESCRIPTION OF THE DRAWINGS

This invention is described with particularity in the detailed description. The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

An active suspension system for a vehicle includes a controllable force source that provides a variable force between a wheel assembly of a vehicle and the chassis of the vehicle. The wheel assembly consists of the various moving parts that are mechanically connected to the wheel such as linkages, control arms, hubs, axles, etc. The moving parts contribute to the overall mass of the wheel assembly. It is generally desirable to reduce the moving mass of the wheel.

Figure 1:
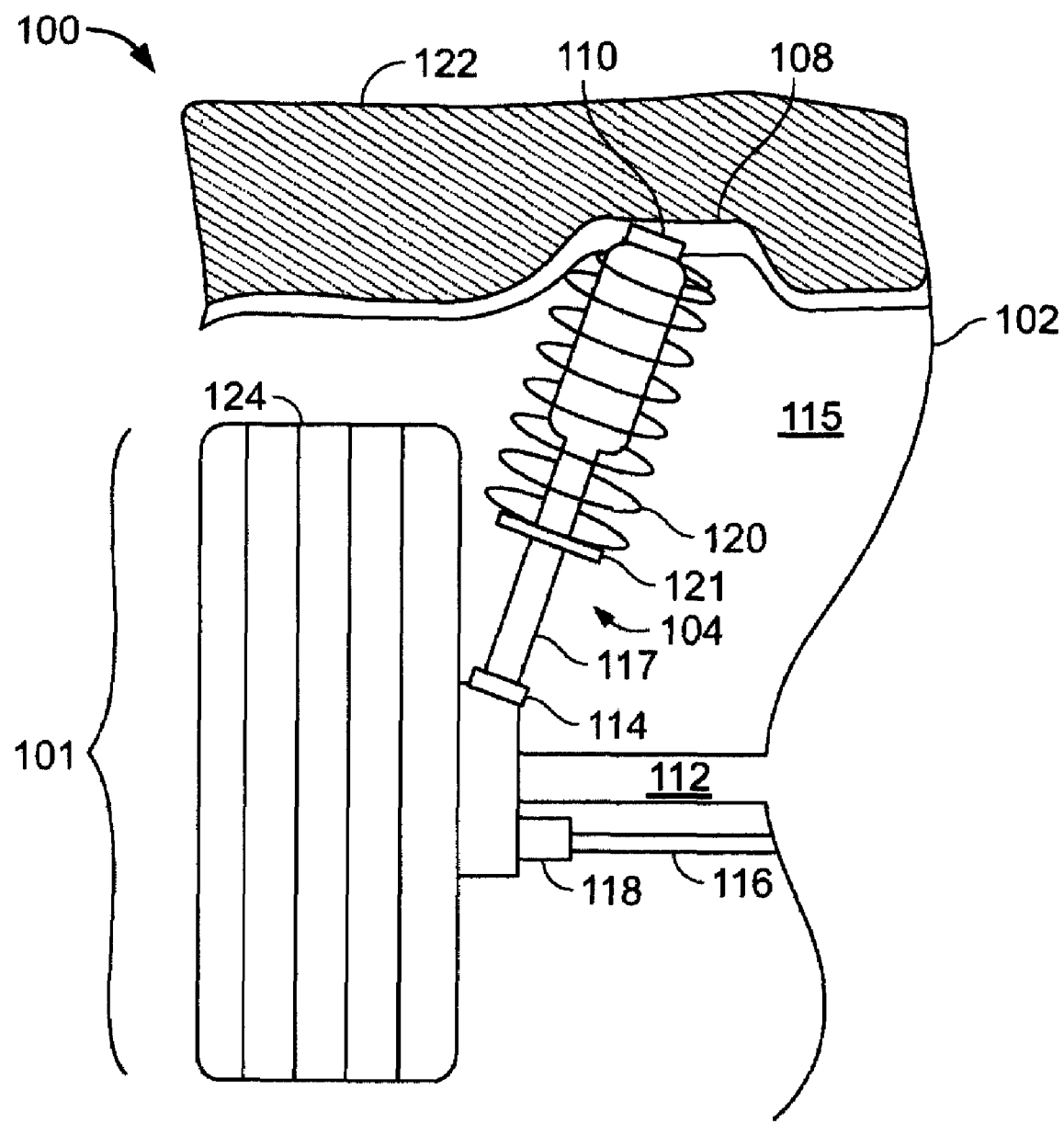
FIG. 1 is a diagram of a typical active suspension system for a single wheel of a vehicle.

FIG. 1 is a diagram of an active suspension system 100 for a single wheel assembly 101 of a vehicle 102. For clarity, the vehicle axle, drive shaft, universal joint, and various other components of the wheel assembly 101 are not shown. The active suspension system 100 includes a controllable force actuator 104 that is coupled between the wheel assembly 101 and a suspension tower 108 of the vehicle 102. The actuator 104 can be an electromagnetic actuator or a hydraulic actuator, for example. The top of the controllable force actuator 104 is generally mounted to the tower 108 through a first bushing 110. The bottom of the controllable force actuator 104 can be mounted directly to a lower control arm 112 or through a second bushing 114.

The bottom of the actuator 104 attaches to the wheel knuckle as close to the vertical centerline of the wheel as possible. In this way, the actuator 104 achieves a nearly one-to-one motion ratio with the wheel. Thus, motion of the actuator's armature results in a corresponding motion of the wheel. This nearly one-to-one motion ratio means that substantially all of the force generated by the actuator 104 is transmitted directly into the wheel tread. As such, substantially all of the force capability of the actuator 104 is effectively used to control the motion of the wheel assembly 101. When one end of the actuator 104 is directly attached to the wheel knuckle, the actuator 104 is said to be mounted "outboard" of the vehicle 102.

The suspension system 100 shown in FIG. 1 uses a "telescoping actuator". By telescoping, we mean that as the wheel assembly 101 moves up and down in response to road excitations, the envelope that encompasses the physical structure of the actuator 104 changes in length. This means that the suspension designer must plan for the change of length of the actuator 104 when planning for the space required in the wheel-well 115 to accommodate the actuator 104. This is in contrast to a "fixed envelope actuator" whose overall envelope does not change with wheel motion. One embodiment of a fixed envelope actuator according to the invention is described with reference to FIG. 2.

The telescoping actuator 104 shown in FIG. 1 can require a rubber bellows (not shown) to protect the moving armature 117 as it slides in and out of the actuator 104. Because the armature 117 may not be circular, the rubber bellows may not have a circular shape. In practice, the lightest part of the actuator 104, which is typically the armature, is connected directly to the wheel knuckle. Thus, the bellows is typically mounted down low, very close to the wheel. Additionally, since the bellows must be large enough to surround the armature of the actuator 104, the volume of air inside the bellows is relatively large. Thus, the amount of air exchanged when the armature 117 moves is significant. As such, the actuator 104 is required to "breathe" (i.e., exchange air as the armature moves up and down) to prevent the bellows from collapsing and expanding. An air vent (not shown) is generally required to regulate the pressure inside and outside of the actuator 104.

The steering linkage includes a tie rod 116. The tie rod 116 is coupled to a spindle 118 of the wheel assembly 101 and controls the direction of travel of the vehicle. Additionally, a passive suspension element 120 can be coupled between the suspension tower 108 and the lower control arm 112 in parallel with the actuator 104. In the embodiment shown, one end of the passive suspension element 120 is coupled to a plate 121 that is attached to a midpoint of the armature 117 of the actuator 104. The passive suspension element 120 can be a coil spring or an airbag, for example. Alternatively, a spring can be attached between a control arm of the suspension and the vehicle chassis.

The suspension tower 108 is coupled to the chassis 122 of the vehicle 102. The chassis 122 of the vehicle 102 is coupled to the frame (not shown) of the vehicle 102. The frame of the vehicle 102 is the base upon which the chassis 122 and other components of the vehicle 102 are built. For example, the end of the lower control arm 112 that is not shown is coupled to the frame of the vehicle 102. Since the suspension tower 108 is directly coupled through sheet metal to the frame of the vehicle 102, both the suspension tower 108 and the frame can be considered structural elements in the vehicle 102 and appropriate for force transfer paths. It should be noted that only the upper end of the actuator 104 of FIG. 1 is directly mounted to the chassis/frame.

The actuator 104 and the passive suspension element 120 control the vertical deflection of the wheel. The angle of the actuator 104 relative to a vertical plane is optimized for the specific suspension geometry of the vehicle 102.

In this configuration, the actuator 104 is directly coupled into the suspension linkage of the vehicle 102. More specifically, the actuator 104 of the active suspension system 100 of FIG. 1 is used as a structural element of the suspension. This, in turn, requires that the bearing system in the actuator 104 serve two distinct functions: (1) maintain the magnetic air gap between the moving armature and the stationary assembly and (2) handle cornering and breaking loads coming in to the actuator 104 from the suspension. These cornering and breaking loads are sometimes referred to as bending loads.

When a pothole or other roadway anomaly is encountered, vertical, fore-aft, and/or side-side forces are transmitted into the tire 124. The active suspension system 100 shown in FIG. 1 can be used to attenuate the vertical motion of the chassis 122 that results from these road excitations. The suspension system 100 as shown does not substantially attenuate fore-aft, side-side or what can be referred to as lateral motion. When a fore-aft force excites the suspension system 100, the entire mass of the actuator 104 (both the vertically moving and non-moving pieces) flexes back and forth on the upper bushing 110 along with the mass of the various other suspension components. A similar result occurs for side-side motions. These lateral motions can also contribute to the bending loads.

When the suspension system 100 of FIG. 1 is used in the front of the vehicle 102, the actuator 104 may be required to steer with the wheel. To enable the actuator 104 to steer, a rotary bearing is required. In addition, allowing the actuator 104 to steer requires the use of flexible power and control cables having adequate strain relief routed to the actuator 104. Also, since the actuator 104 is directly coupled into the steering linkage, the steering linkage must accommodate the additional mass of the actuator 104 along with the mass of the steering-related components of the wheel.

Figure 2:
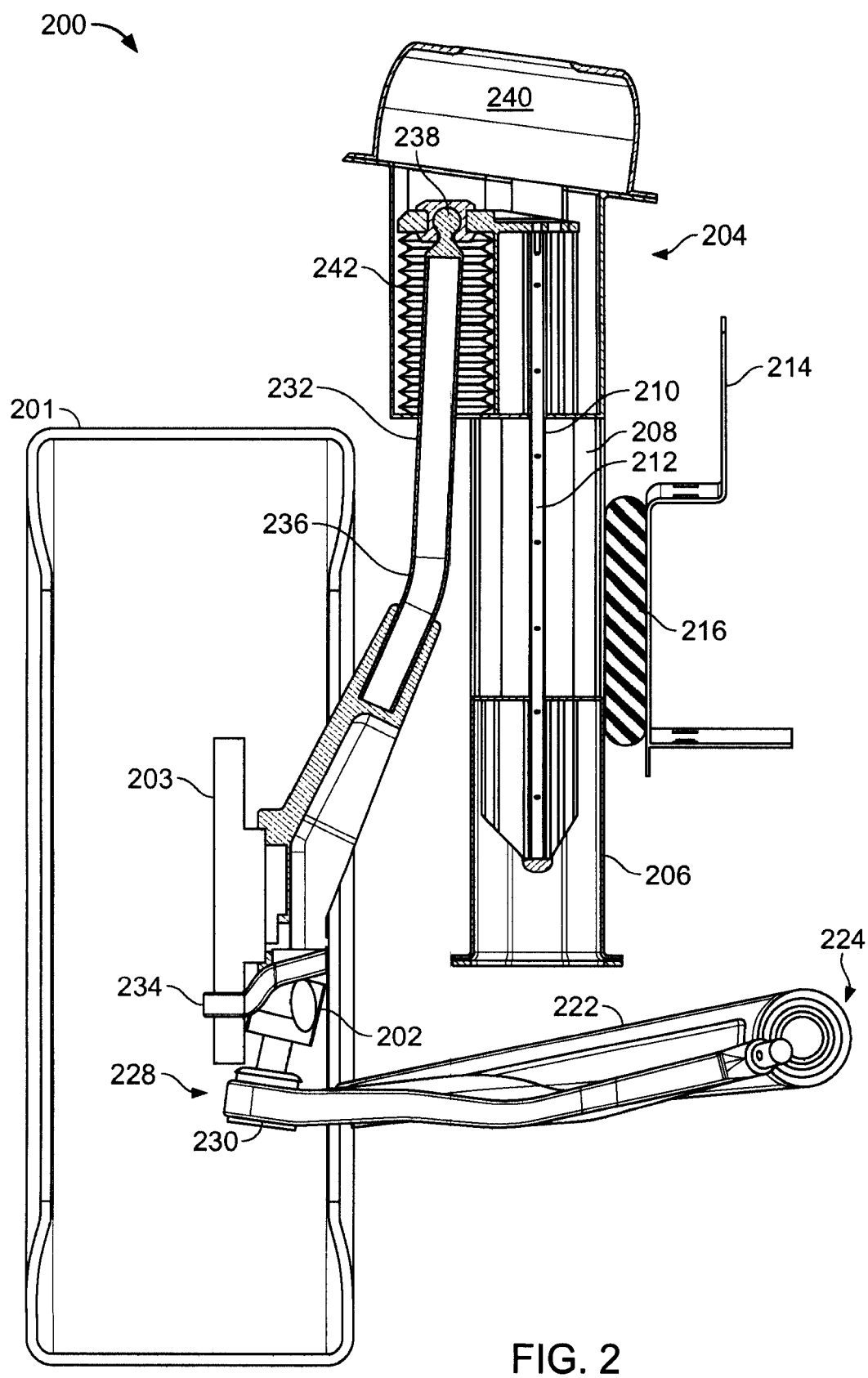
FIG. 2 illustrates an active suspension system for a single wheel assembly of a vehicle according to one embodiment of the invention.

FIG. 2 illustrates an active suspension system 200 for a single wheel assembly of a vehicle according to one embodiment of the invention. Although the single-wheel model is described, the invention can be applied to all of the wheels of the vehicle. The wheel assembly includes the tire 201, spindle 202, hub 203, vehicle axle (not shown), drive shaft (not shown), universal joint (not shown), and various other moving components.

The active suspension system 200 includes an active suspension element 204. For example, the active suspension element 204 can embody an electromagnetic actuator. The actuator 204 can be a linear actuator or a rotary actuator. Additionally, the actuator 204 can include a moving magnet, moving coil, variable reluctance, or any other known motor topology. An example of an active suspension system having an active suspension element is described in U.S. Pat. No. 4,981,309, entitled "Linear Transducing Along a Path" incorporated herein by reference. This patent describes an active suspension element that embodies an electromagnetic actuator.

The active suspension element 204 can be arranged in a series or parallel configuration with a passive suspension element, such as a spring or an airbag, for example.

The active suspension element 204 includes a case 206. A stator 208 is mounted inside the case 206. The stator 208 can include motor windings. The active suspension element 204 also includes an armature 210. The armature 210 can include one or more magnets (not shown). The armature 210 can also include bearings 212. The bearings 212 maintain the magnetic air gap between the armature 210 and the stator coils and allow the armature 210 to slide relative to the stator 208.

The active suspension element 204 is mechanically coupled to a frame 214 of the vehicle. For example, the active suspension element 204 can be rigidly coupled to the frame 214 or can be coupled to the frame 214 through a bushing 216. In one embodiment, the active suspension element 204 is mounted, perhaps through a bushing, at its midsection to the chassis/frame of the vehicle. In one embodiment, one end of the active suspension element 204 is also attached to the suspension tower in addition to being attached to the midsection of the chassis/frame of the vehicle.

The active suspension element is substantially rigidly attached to the frame of the vehicle such that the active suspension element is substantially mechanically decoupled from a lateral motion of a wheel of the vehicle. By lateral motion, we mean fore-aft and side-side motion. By decoupled, we mean that fore-aft and side-side forces and motion are significantly attenuated before they can be transmitted into the armature 210 and/or active suspension element 204. In one embodiment, the decoupling is achieved through a control rod that is attached between the active suspension element and the wheel of the vehicle. The control rod is described in detail herein.

In one embodiment, heat is conducted from the active suspension element 204 to the frame 214 through the coupling. For example, the stator 208 within the active suspension element 204 includes coils that can generate heat. The heat can be dissipated from the active suspension element 204 into the frame of the vehicle without external vents or active cooling.

A low thermal resistance path between the active suspension element 204 and the vehicle frame 214 may be desired to maximize heat transfer from the active suspension element 204 to the frame 214. A low thermal resistance path can be achieved by using known techniques such as increasing the surface area of contact between the active suspension element 204 and frame 214, using material for the housing that has high thermal conductivity (such as aluminum), preparing mating surfaces to be as flat and co-planar as possible, and/or using thermally conductive filler interface materials such as thermal grease or thermally conductive pads. A thermally conductive bushing can be used as the interface device, where the elastomer used for the bushing has a large percentage of thermally conductive filler added (aluminum or copper flake, or other thermally conductive filler).

A lower control arm 222 includes a first end 224 that is coupled to the frame 214 through a bushing or bearing (not shown). The bushing/bearing allows the lower control arm 222 to rotate as the wheel assembly moves vertically. The lower control arm 222 includes a second end 228 having a ball joint 230 that is coupled to the spindle 202. The spindle 202 includes a steering arm 234. The steering arm 234 is mechanically coupled to a tie rod (not shown). The tie rod is a component in the steering linkage of the vehicle. A movement of the tie rod causes the spindle 202 to steer the wheel of the vehicle.

A control rod 232 is coupled between the active suspension element 204 and the spindle 202 of the wheel assembly. In one embodiment, the control rod 232 is coupled to the armature 210 of the active suspension element 204. The control rod 232 can include a bend 236. The bend 236 is configured to provide sufficient tire clearance from the active suspension element 204. For example, the tire clearance can be two centimeters or more. The control rod 232 can be coupled to the active suspension element 204 through a ball joint 238. The ball joint 238 is configured to allow the control rod 232 to rotate relative to the armature 210 of the active suspension element 204. The control rod 232 can alternatively be coupled to the active suspension element 204 through a bushing (not shown). In one embodiment, the control rod 232 is configured to rotate as the wheel 201 of the vehicle is turned when steering. For example, when the suspension system 200 of FIG. 2 is used in the front of a vehicle, a ball-joint at the top or the bottom of the control rod 232 can be used to enable steering. In general, the cost and complexity of the ball joint is less than the cost of a rotary bearing. In addition, the fixed nature of the active suspension element 204 eliminates the requirement of flexing wires.

Like the suspension system 100 described in FIG. 1, the suspension system 200 of FIG. 2 achieves substantially a one-to-one motion ratio between the motion of the armature 210 and the motion of the wheel assembly. However the one-to-one motion ratio is achieved differently. Specifically, the control rod 232 ensures that any motion of the armature 210 directly results in motion of the wheel. Similar to the system 100 of FIG. 1, all of the force capability of the active suspension element 204 is effectively used to control the motion of the wheel. However, the configuration of FIG. 2 does not require one end of the active suspension element 204 to be attached to the knuckle near the wheel. In turn, this makes the packaging of the active suspension element 204 relatively straightforward since the cross section of the control rod 232 is generally simple to design and smaller than the corresponding section of the active suspension element 204. Since the active suspension element 204 is not directly attached to the wheel knuckle, the active suspension element 204 is said to be mounted "inboard" to the vehicle. The inboard mounted active suspension element 204 can be easier to package and allows for more clearance between the wheel and the active suspension element 204.

The bearing system 212 in the active suspension element 204 generally serves two functions. The first function of the bearing system 212 is to maintain the magnetic air gap between the armature 210 and the stator 208. The second function of the bearing system 212 is to absorb cornering and breaking loads. It can be shown that the magnitude of the cornering and breaking loads that are transferred into the bearings of the actuator 204 in FIG. 2 is reduced as compared to those of the actuator 104 of FIG. 1. This is due, at least in part to the control rod 232 being configured to absorb much of the stress from bending loads that would otherwise couple into the armature 210 through the bearings 212. Furthermore, when a fore-aft force excites the suspension system 100 shown in FIG. 1, the entire mass of the actuator 104 (both the vertically moving and non-moving pieces) flexes back and forth on the upper bushing along with the mass of the various other suspension components. A similar result occurs for side-side motions. Conversely, when a fore-aft force excites the suspension system 200 of FIG. 2, only the mass of the control rod 232 flexes back and forth along with the mass of the various other suspension components. This is also true for side-side excitations. As such, the flexing mass in the suspension system 200 of FIG. 2 is reduced as compared to the flexing mass in the suspension system 100 of FIG. 1.

In contrast to the actuator 104 of FIG. 1, the active suspension element 204 is referred to as a fixed envelope actuator. In this embodiment, the control rod 232 connecting the armature 210 to the wheel goes up and down with the wheel, but the overall case 206 enclosing the actuator 204 does not change in length. This fixed envelope can be a packaging advantage.

The active suspension element 204 can include a top cover 240. The top cover 240 protects the stator 208, armature 210, and other components within the active suspension element 204. For example, the other components can include sensors, such as position sensors or accelerometers or printed circuit boards and other circuitry. In one embodiment, amplifier circuitry (not shown) is integrated within the active suspension element 204.

The top cover 240 also covers a portion of the control rod 232. A bellows 242 can be position around a portion of the control rod 232 to further protect the internal components of the active suspension element 204 from external debris. The bellows 242 can be made relatively small since it surrounds the control rod 232. Thus, the volume of sealed air within the bellows 242 can be made sufficiently small so as not to require external venting when the bellows 242 expands and contracts. The small bellows 242 in FIG. 2 reduces the "breathing" problem and potentially eliminates the need to allow for air exchange. Thus, the active suspension element 204 can be a sealed actuator.

Thus, in one embodiment, the active suspension system 200 includes an active suspension element 204 that embodies a linear electromagnetic actuator. The actuator can include a stator and an armature that is movable relative to the stator. The stator can be substantially rigidly attached to a frame of the vehicle. A control rod having a first end is attached to the armature. The second end of the control rod is attached to a wheel of the vehicle such that a movement of the armature causes the wheel of the vehicle to move relative to the frame of the vehicle.

Figure 3A:
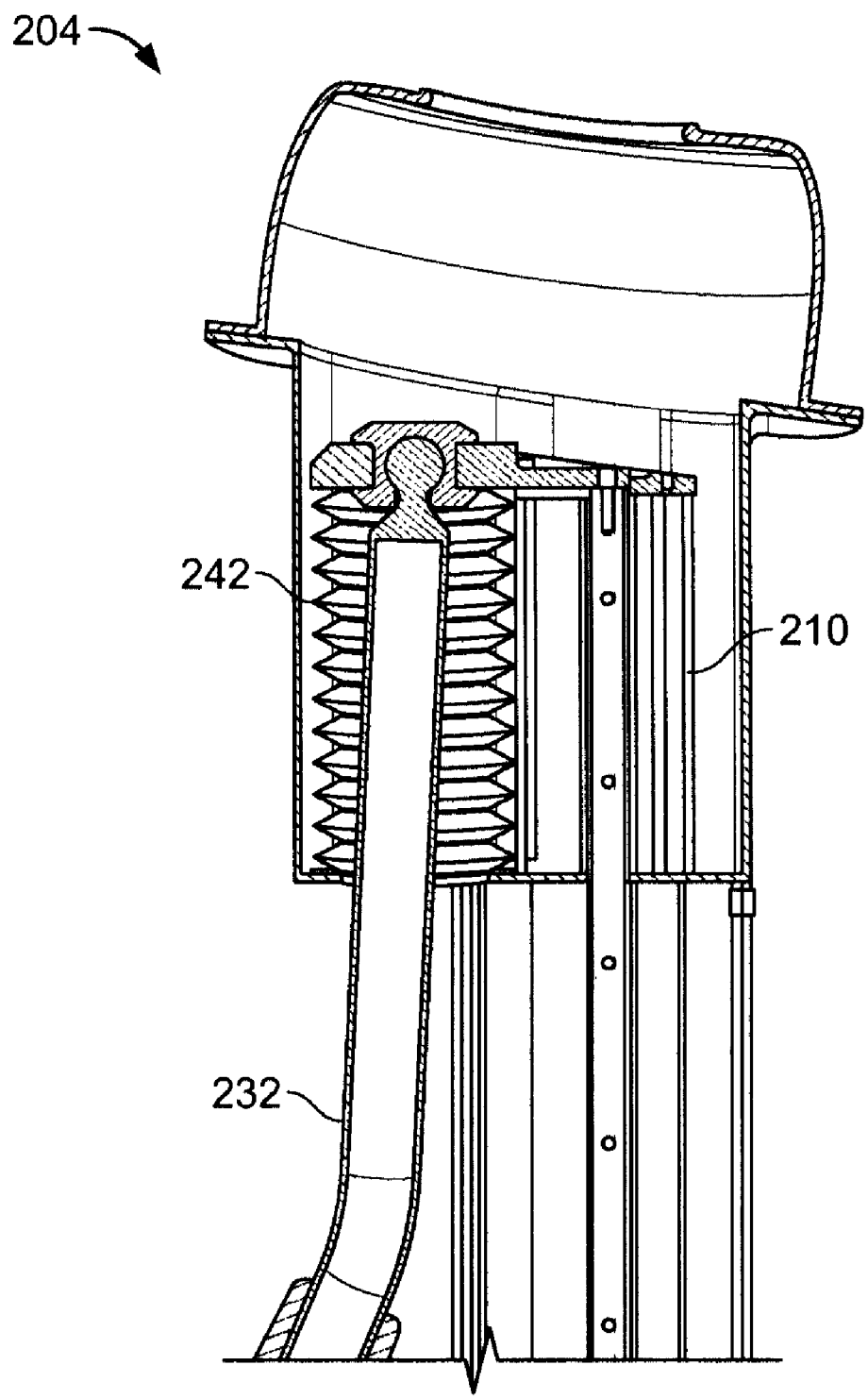
FIG. 3A through FIG. 3C illustrate the motion of the control rod relative to the active suspension element according to the invention.
Figure 3B:
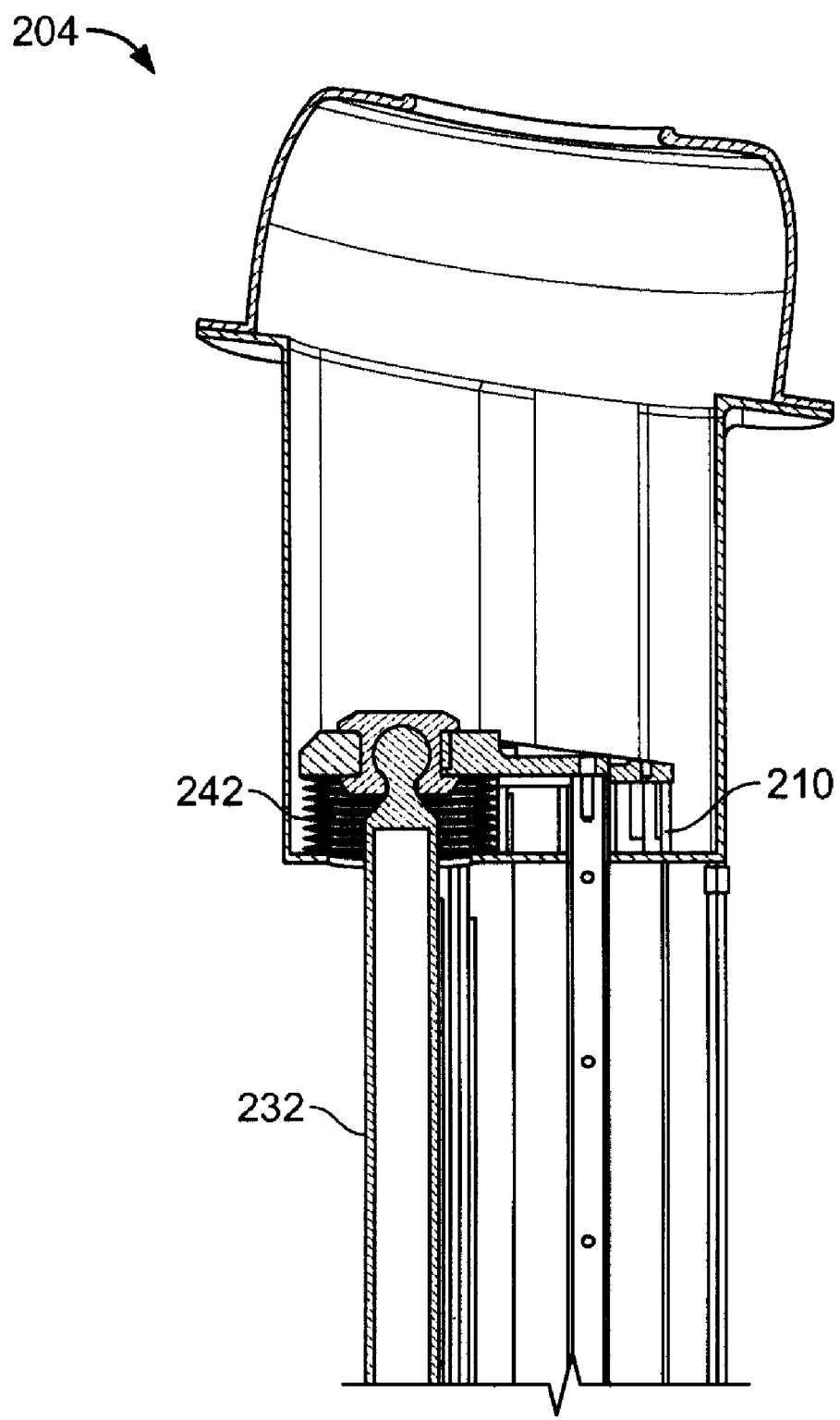
Figure 3C:
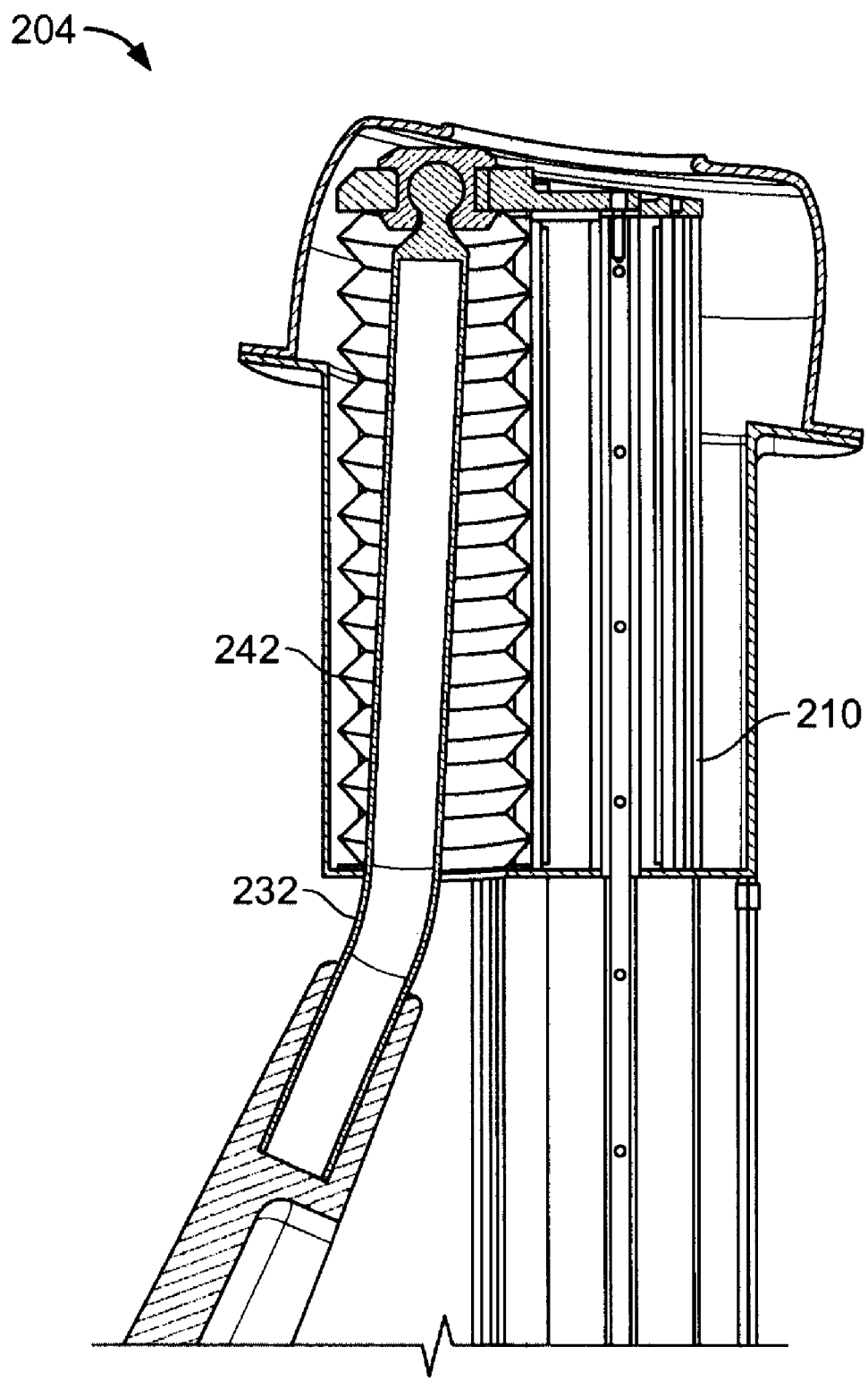

FIG. 3A, FIG. 3B, and FIG. 3C illustrate the motion of the control rod 232 relative to the active suspension element 204 according to the invention. A controller (not shown) generates a control signal that controls the motion of the armature 210 in the active suspension element 204. The controller can transmit the control signal to an amplifier (not shown) that drives the active suspension element 204. The amplifier can be external to the active suspension element 204 or contained within the active suspension element 204.

As previously described, the ratio of the motion of the control rod 232 to the motion of the armature 210 of the active suspension element 204 can be one-to-one. In one embodiment, the ratio can be different than one-to-one. For example, for each one-inch of displacement of the armature 210, the control rod 232 can be displaced by more than one-inch or less than one-inch depending on the mechanical design of the system. In one configuration, the lower end of the control rod 232 can be attached in the middle of the lower control arm 222 (FIG. 2), instead of at the spindle 202. Additionally, one or more mechanical links can be added between the control rod 232 and the wheel assembly and/or armature 210 to change the ratio of the motion of the control rod 232 to the motion of the wheel assembly and/or armature 210.

FIG. 3A illustrates an example in which the armature 210 of the active suspension element 204 is in the neutral or center position. The control rod 232 is also at a center position. The bellows 242 is illustrated in a semi-compressed state.

FIG. 3B illustrates an example in which the armature 210 of the active suspension element 204 is in the lowest position. The control rod 232 is also at the lowest position. The bellows 242 is illustrated in a fully compressed state.

FIG. 3C illustrates an example in which the armature 210 of the active suspension element 204 is in the highest position. The control rod 232 is also at the highest position. The bellows 242 is illustrated in an expanded state.

Figure 4:
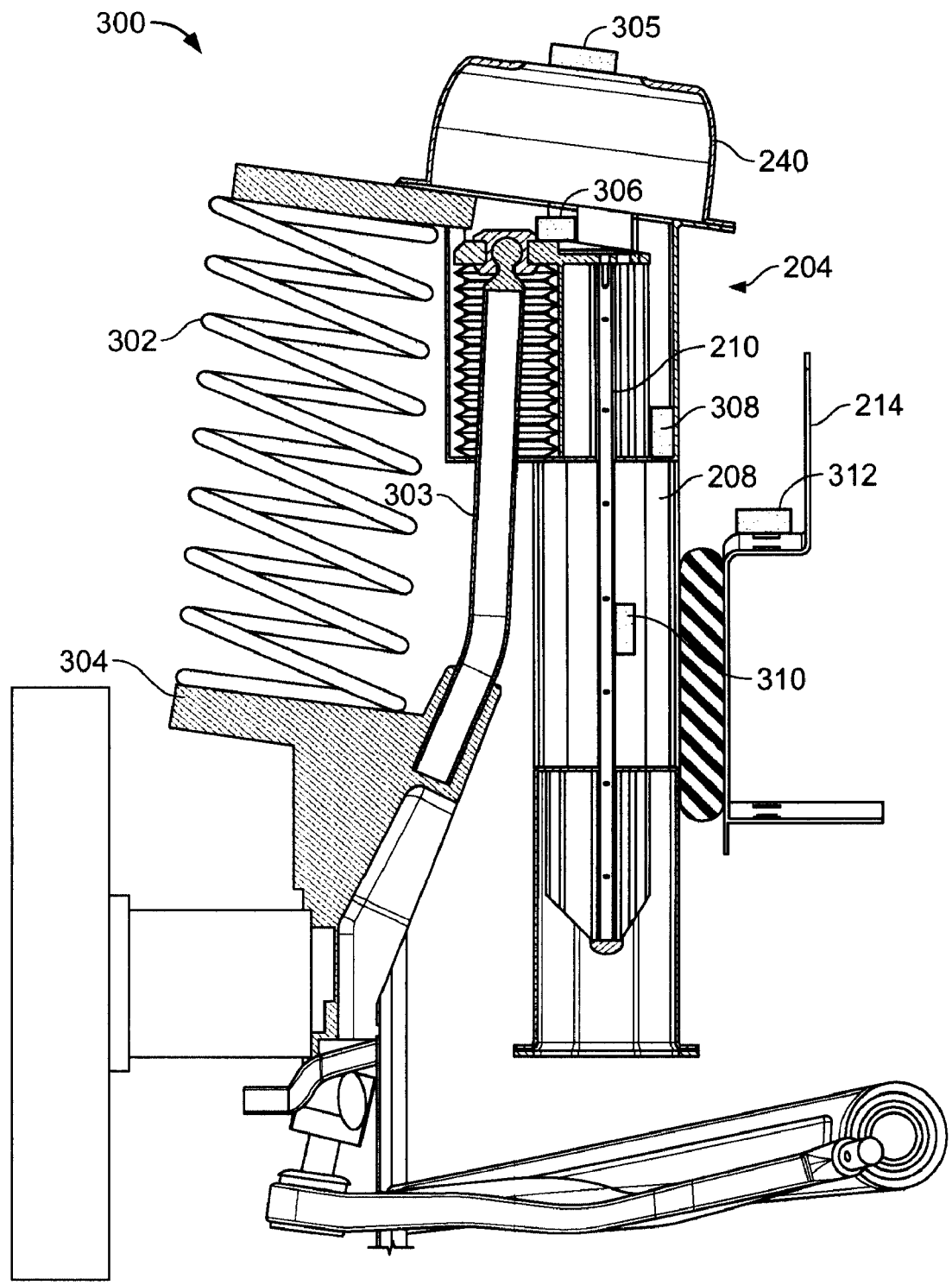
FIG. 4 illustrates an active suspension system for a single wheel assembly of a vehicle according to another embodiment of the invention.

FIG. 4 illustrates an active suspension system 300 for a single wheel assembly of a vehicle according to another embodiment of the invention. The active suspension system 300 includes the active suspension element 204 as well as a passive suspension element 302. In the embodiment shown, the passive suspension element 302 is a coil spring that is in a parallel configuration with the active suspension element 204. In other embodiments, the passive suspension element is a torsional spring, a leaf spring or an air spring, for example. The passive element 302 may be physically constructed from one or more devices in series or parallel and may be protected by the case that houses the active suspension element 204. For example, air springs can be mounted in parallel on the front and back sides of element 204. In another embodiment (not shown), the passive suspension element 302 can be in a serial configuration with the active suspension element 204. In general, the passive suspension element 302 can be mounted anywhere between a moving element of the wheel assembly and a frame or chassis of the vehicle.

The active suspension system 300 also includes a control rod 303 that is coupled to the active suspension element 204. The control rod 303 can include a bracket 304 for supporting the lower end of the passive suspension element 302.

The active suspension system 300 can also include one or more sensors that can generate sensor signals that indicate the motion of the various components in the system 300. The sensors can be coupled to a controller (not shown) having a processor. The controller receives the sensor signals and generates control signals. The control signals are transmitted to an amplifier (not shown) that drives the active suspension element 204. The controller and/or the amplifier can be integrated into the active suspension element 204 or can be external to the active suspension element 204.

For example, a sensor 305 can be attached to the top cover 240. The sensor 305 can be an accelerometer, for example, that can measure the motion of the active suspension element 204 as the vehicle traverses a road surface.

Another sensor 306 can be positioned on the armature 210 of the active suspension element 204. The sensor 306 can be an accelerometer that measures the motion of the armature 210. The motion of the armature 210 is directly related to the motion of the control rod 303 and thus the motion of the wheel. In another embodiment, the sensor 306 can be a displacement sensor that measures the position of the armature 210.

A sensor 308 can be positioned within the active suspension element 204. The sensor 308 can be a displacement sensor that measures the position of the armature 210 relative to the stator 208. The position of the armature 210 corresponds to the position of the control rod 303 and thus the position of the wheel. In one embodiment, a sensor 310 can be positioned on the armature 210. The sensor 310 can be a displacement sensor that measures the position of the armature 210 relative to the stator 208. An example of a displacement sensor is described in U.S. Pat. No. 5,574,445, entitled "Digital Absolute Position Encoders" incorporated herein by reference. Alternative sensors can be used in various configurations and positioned in various locations on the vehicle to measure parameters of the vehicle frame 214 and/or the wheel assembly.

Another sensor 312 can be positioned on the frame 214 of the vehicle. The sensor 312 can be an accelerometer that measures the motion of the frame 214 as the vehicle traverses a road surface. Any number of sensors or combinations of sensors can be used to measure the motion of the frame 214, the armature 210, and the wheel assembly. The term "motion" as used herein can mean displacement, velocity, and/or acceleration.

Figure 5:
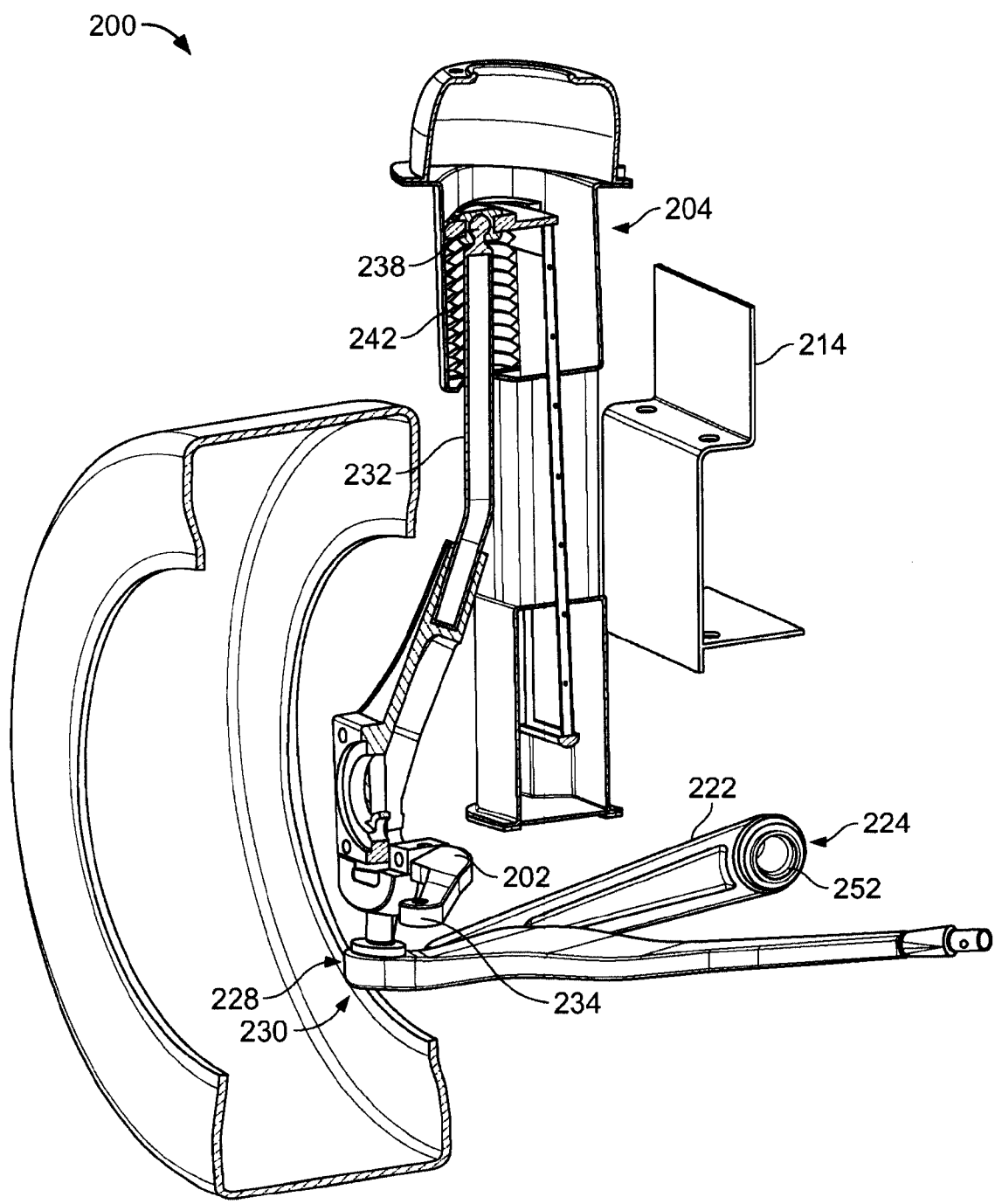
FIG. 5 illustrates a perspective view of the active suspension system of FIG. 2.

FIG. 5 illustrates a perspective view of the active suspension system 200 of FIG. 2. The active suspension system 200 includes the active suspension element 204. The active suspension element 204 is mechanically coupled to the frame 214 of the vehicle. As previously described, the mass of the active suspension element 204 is substantially decoupled from the components of the wheel assembly.

The control rod 232 is mechanically coupled to the active suspension element 204 through the ball joint 238. The ball joint 238 is configured to allow the control rod 232 to rotate side to side as the wheel moves to steer the vehicle. The steering arm 234 of the spindle 202 is coupled to a tie rod (not shown) to facilitate the steering. The first end 228 of the lower control arm 222 is coupled to the lower ball joint 230. The second end 224 of the lower control arm 222 includes a fitting 252. In one embodiment, the fitting 252 is adapted to receive a torsional spring that includes a splined end. The torsional spring is configured to support at least a portion of the static mass of the vehicle. In other embodiments, coil springs, leaf springs, and/or air springs can also be used.

The bellows 242 is configured to allow the control rod 232 to move vertically while preventing external debris from contaminating the internal components of the active suspension element 204. The bellows 242 can be fabricated from a suitably flexible material, such as rubber, plastic, or fabric, for example. Additionally, the volume of air inside the bellows 242 can be made sufficiently small so as to not require external venting. Other sealing structures can also be used to seal the active suspension element 204, such as a baffle, a telescoping conduit, or a rubber tube, for example.

Figure 6:
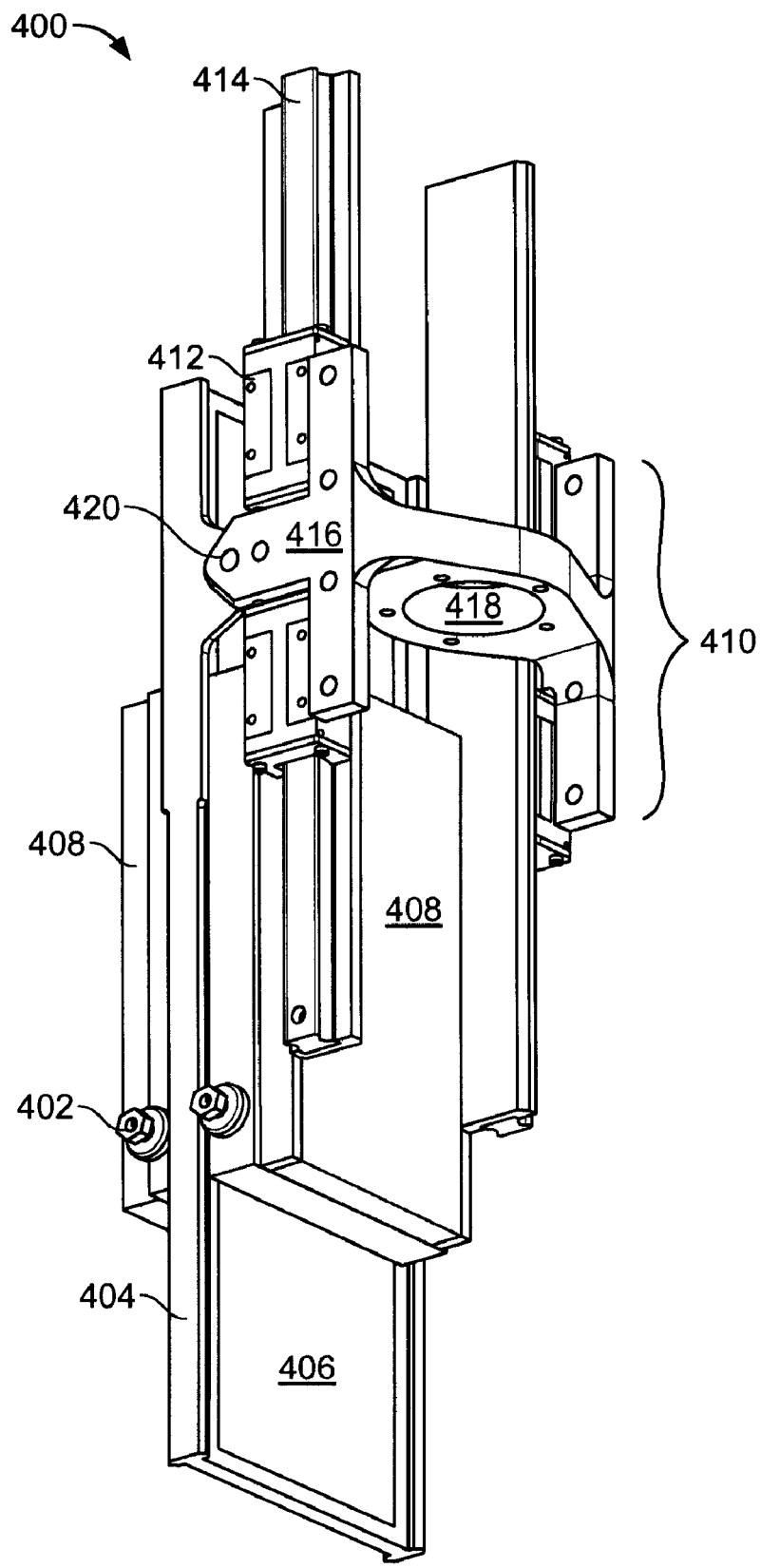
FIG. 6 illustrates an electromagnetic actuator according to one embodiment of the invention.

FIG. 6 illustrates an electromagnetic actuator 400 according to one embodiment of the invention. The electromagnetic actuator 400 is a dual-bearing actuator. For example, a first bearing 402 is used to maintain the magnetic gap in the motor structure of the electromagnetic actuator 400. The first bearing 402 is coupled to a rail 404 of an armature 406 of the actuator 400 and permits the armature 406 to move relative to a stator 408 of the actuator 400. In one embodiment of the invention, rail 404 may utilize two bearings trucks to maintain the magnetic air gap.

In one embodiment, the stator 408 is rigidly attached to a frame of the vehicle. The stator 408 can also be attached to the frame through a bushing. The frame mounting allows control signal and power cables to be coupled to the actuator 400 with minimal flexing. For example, the signal and power cables can be routed along the frame of the vehicle and attach directly to the frame-mounted actuator 400. Thus, cable flexing is minimized, thereby reducing the risk of cable failure. Additionally, power cables carrying relatively large current can be well insulated and protected from road debris, etc.

A second bearing system 410 is used to carry the suspension loads. For example, the second bearing system 410 can prevent substantially all of the cornering and breaking loads of the suspension system from being transferred into the armature 406. This simplifies the design and load requirements of the first bearing 402. The second bearing system 410 includes bearing trucks 412. The bearing trucks 412 ride on bearing rails 414. The bearing rails 414 are rigidly mounted to the stator 408 which is generally mounted to the frame of the vehicle. It should be noted that the cornering and breaking loads can translate into lateral motion of the wheel including fore-aft and side-side motion.

A carriage 416 is mechanically coupled to the bearing trucks 412. The carriage 416 is configured with a pocket 418 that is designed to accept a ball joint. The ball joint is attached on the top of a control rod, such as the control rod 232 shown in FIG. 2. In one embodiment, a bushing (not shown) can be used at the top of a control rod instead of a ball joint. In this embodiment, the pocket 418 is configured to receive the bushing.

In one embodiment, the carriage 416 is coupled to the armature 404 though a pin 420. The pin 420 can be fabricated from any suitable material, such as hardened steel, for example. In another embodiment, the carriage 416 can be coupled to the armature 404 through a flexure (not shown) instead of a pin.

The pin 420 may allow the carriage 416 to move relative to the armature 406. This can further decouple the suspension bending loads from the first bearing 402. Thus, the first bearing 402 is not required to absorb the suspension bending loads and can be simpler in its design.

The electromagnetic actuator 400 can also include various sensors (not shown). The sensors can measure various parameters of the electromagnetic actuator 400. For example, a position sensor can be used to determine the position of the armature 406 relative to the stator 408. An accelerometer can be used to measure the motion of the carriage 416. The sensor signals can be transmitted to a controller (not shown) that is either integrated with or external to the electromagnetic actuator 400. The controller generates control signals that are used to control the electromagnetic actuator 400. In one embodiment, the control signals control an amplifier (not shown) that energizes the electromagnetic actuator 400. The amplifier can be integrated with or external to the electromagnetic actuator 400.

In operation, a controller (not shown) transmits a control signal to an amplifier that is electrically coupled to the coils of the stator 408. The control signal receives a sensor signal and instructs the electromagnetic actuator 400 to initialize and move to a neutral position. As the vehicle traverses the roadway, excitations from the roadway cause the wheels and chassis to move in a substantially vertical direction. Sensors in or on the electromagnetic actuator 400, on the wheel and/or on the chassis of the vehicle track the motion of the wheel and the chassis and transmit sensor signals to the controller. The controller generates control signals and transmits the control signals to the amplifier. The amplifier processes and transmits the control signals to the electromagnetic actuator 400. In one embodiment, the controller, based on feedback signals from the sensors, attempts to minimize rapid vertical motion of the chassis as the vehicle traverses rough terrain. Control signals from the controller can also cause the wheels to closely track the various contours of the terrain.

Figure 7A:
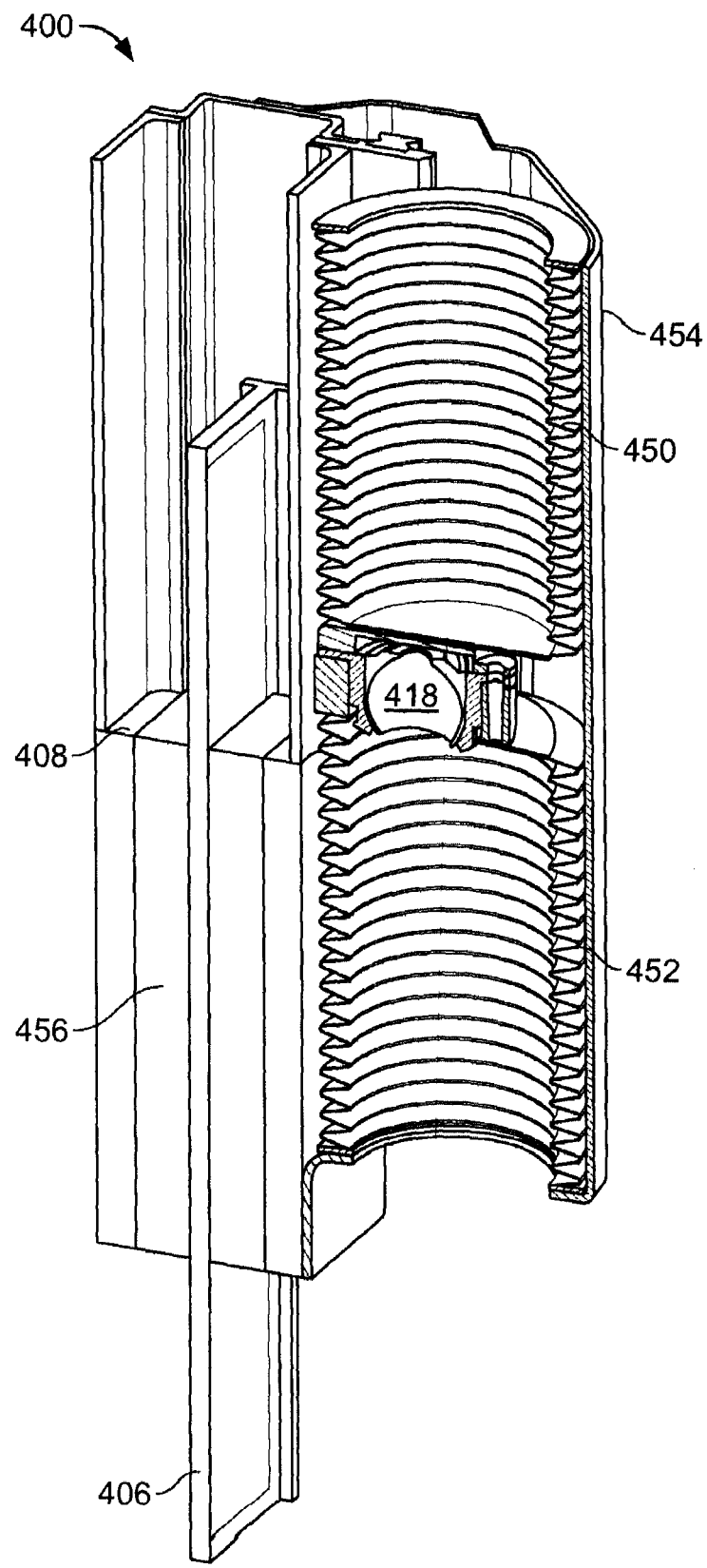
FIG. 7A through FIG. 7C illustrate the motion of a bellows of the electromagnetic actuator of FIG. 6.
Figure 7B:
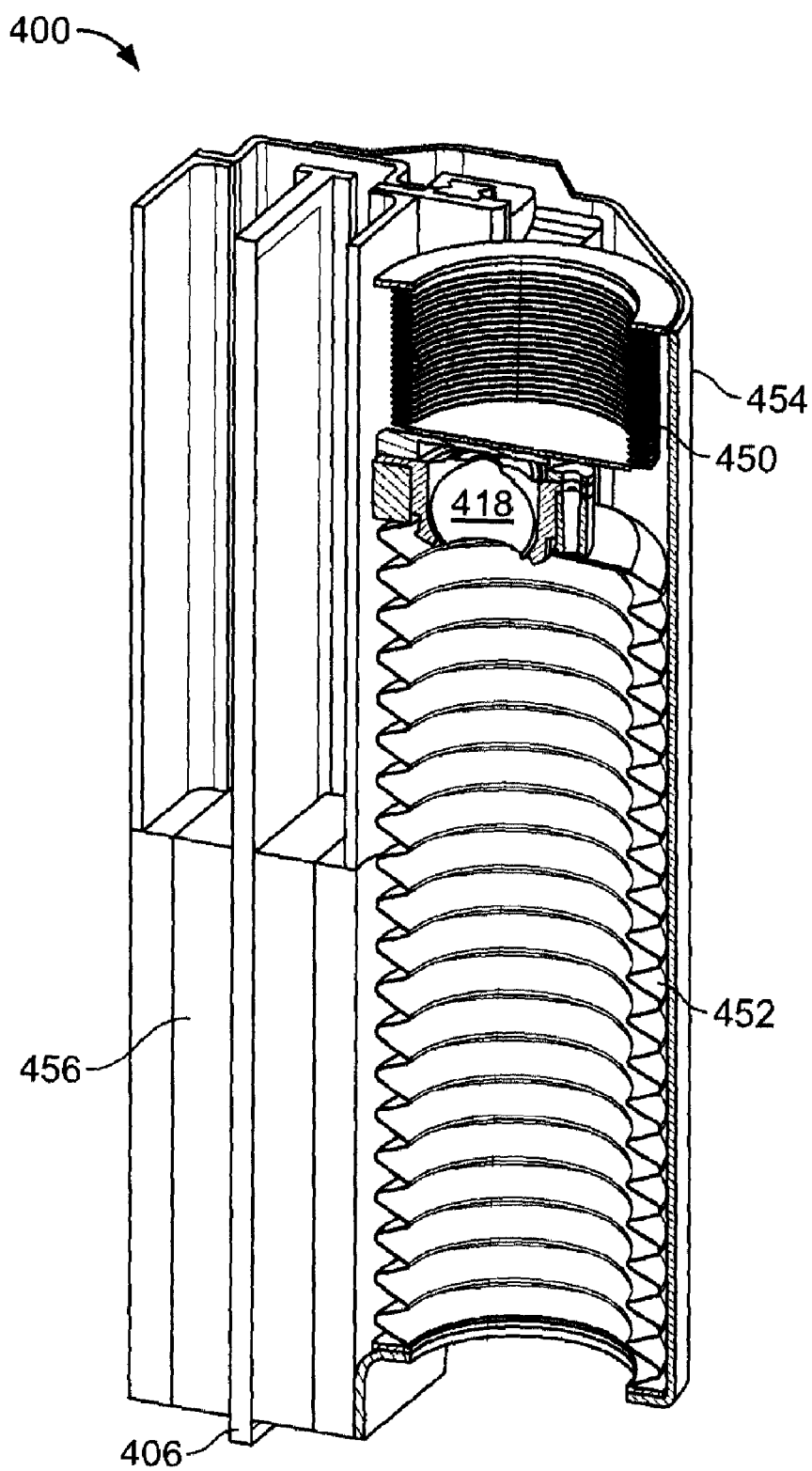
Figure 7C:
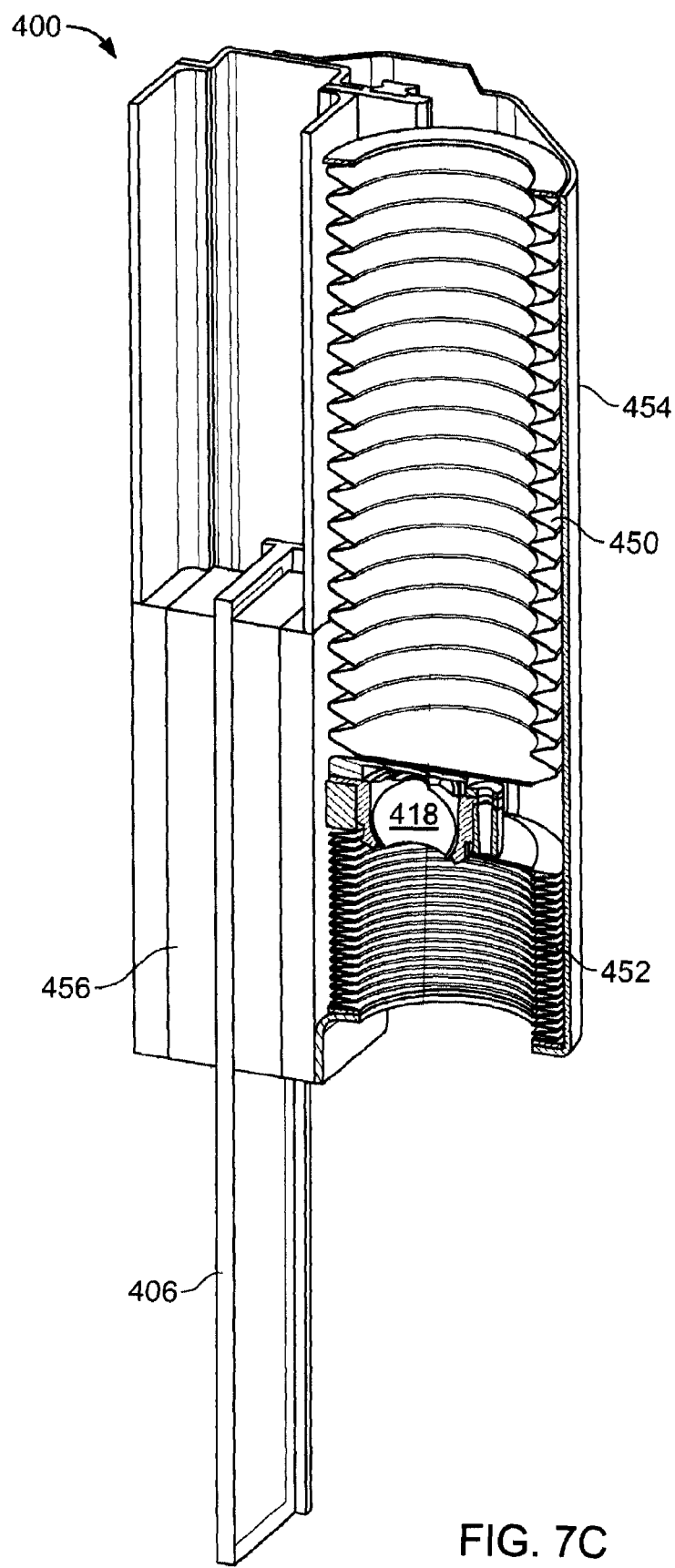

FIG. 7A, FIG. 7B, and FIG. 7C illustrate the motion of a pair of bellows 450, 452 of the electromagnetic actuator 400 of FIG. 6. Each of the bellows 450, 452 can be substantially surrounded by a protective sleeve 454. The protective sleeve 454 shields each of the bellows 450, 452 from the external environment. A casing 456 surrounds and protects the stator 408 and the armature 406.

FIG. 7A illustrates an example in which the armature 406 of the actuator 400 is in the neutral or center position. The pocket 418 that receives the ball joint is also at a center position. Each of the pair of bellows 450, 452 is illustrated in a semi-compressed state. In one embodiment, the pair of bellows 450, 452 are sealed from the external environment but fluidly coupled to each other. Thus, air can be exchanged between each bellows 450, 452. The air exchange can regulate the air pressure inside each bellows 450, 452 during operation, thereby preventing the pressure from damaging one or both of the bellows 450, 452. In one embodiment, air holes can be located through the carriage 416 to allow air to be transferred between the pair of bellows 450, 452.

FIG. 7B illustrates an example in which the armature 406 of the actuator 400 is in the highest position. The pocket 418 is also at the highest position. The first bellows 450 is illustrated in a fully compressed state and the second bellows 452 is illustrated in an expanded state.

FIG. 7C illustrates an example in which the armature 406 of the actuator 400 is in the lowest position. The pocket 418 is also at the lowest position. The first bellows 450 is illustrated in an expanded state and the second bellows 452 is illustrated in a fully compressed state.

While the invention has been particularly shown and described with reference to specific exemplary embodiments, it is evident that those skilled in the art may now make numerous modifications of, departures from and uses of the specific apparatus and techniques herein disclosed. Consequently, the invention is to be construed as embracing each and every novel feature and novel combination of features presented in or possessed by the apparatus and techniques herein disclosed and limited only by the spirit and scope of the appended claims.

What is claimed is:

1. An active suspension system for a vehicle comprising:
   a linear electromagnetic actuator comprising a stator and an armature that is movable relative to the stator, the stator being substantially rigidly attached to a frame of the vehicle; and
   a control rod having a first end that is attached to the armature and having a second end that is attached to a wheel of the vehicle such that a movement of the armature causes the wheel of the vehicle to move relative to the frame of the vehicle;
   wherein the linear electromagnetic actuator is substantially mechanically decoupled from a lateral motion of the wheel of the vehicle.

2. The active suspension system of claim 1 further comprising a passive suspension element that is coupled between the frame of the vehicle and the wheel of the vehicle.

3. The active suspension system of claim 2 wherein the passive suspension element is chosen from the group comprising a spring and a damper.

4. The active suspension system of claim 1 wherein the linear electromagnetic actuator comprises a moving magnet electromagnetic actuator.

5. The active suspension system of claim 1 further comprising a passive suspension element that is coupled between a chassis of the vehicle and the wheel of the vehicle.

6. The active suspension system of claim 1 wherein the stator is attached to the frame of the vehicle through a bushing.

7. The active suspension system of claim 1 wherein the first end of the control rod is attached to the armature through a ball joint.

8. The active suspension system of claim 1 wherein the first end of the control rod is attached to the armature through a bushing.

9. The active suspension system of claim 1 wherein the movement of the armature causes the wheel of the vehicle to move in a substantially vertical direction relative to a horizontal plane of the vehicle.

10. The active suspension system of claim 1 wherein a ratio between a motion of the armature and a motion of the wheel is substantially one-to-one.

11. The active suspension system of claim 1 wherein a ratio between a motion of the armature and a motion of the wheel is less than one-to-one.

12. The active suspension system of claim 1 further comprising a sensor that is attached to one of the linear electromagnetic actuator, the frame, and the wheel.

13. The active suspension system of claim 12 wherein the sensor is integrated with the linear electromagnetic actuator.

14. An active suspension system for a vehicle comprising:
  a linear electromagnetic actuator comprising a stator and an armature that is movable relative to the stator, the stator being substantially rigidly attached to a frame of the vehicle; and
  a control rod having a first end that is attached to the armature and having a second end that is attached to a wheel of the vehicle such that a movement of the armature causes the wheel of the vehicle to move relative to the frame of the vehicle;
  wherein the control rod comprises a bent portion.

15. A linear electromagnetic actuator for an active suspension system of a vehicle, the actuator comprising:
  a stator;
  an armature that is magnetically coupled to the stator;
  a first bearing that is mechanically coupled to the armature, the first bearing maintaining an air gap between the armature and the stator; and
  a second bearing that is mechanically coupled to the stator and substantially mechanically decoupled from the armature, the second bearing absorbing suspension related bending loads, thereby minimizing the suspension related bending loads on the armature.

16. The actuator of claim 15 wherein the stator comprises at least one coil.

* * * * *